United States Patent
Elen et al.

(10) Patent No.: US 11,292,867 B2
(45) Date of Patent: Apr. 5, 2022

(54) POLYURETHANE FOAMS HAVING IMPROVED MECHANICAL PERFORMANCE

(71) Applicant: Huntsman International LLC, The Woodlands, TX (US)

(72) Inventors: Raf Elen, Oplinter (BE); Luc Van Essche, Kortenberg (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 16/332,397

(22) PCT Filed: Aug. 22, 2017

(86) PCT No.: PCT/EP2017/071116
§ 371 (c)(1),
(2) Date: Mar. 12, 2019

(87) PCT Pub. No.: WO2018/054633
PCT Pub. Date: Mar. 29, 2018

(65) Prior Publication Data
US 2021/0277169 A1 Sep. 9, 2021

(30) Foreign Application Priority Data
Sep. 23, 2016 (EP) .................................... 16190348

(51) Int. Cl.
*C08G 18/48* (2006.01)
*C08G 18/62* (2006.01)
*C08G 18/63* (2006.01)
*C08G 18/76* (2006.01)

(52) U.S. Cl.
CPC ....... *C08G 18/4833* (2013.01); *C08G 18/632* (2013.01); *C08G 18/7664* (2013.01); *C08G 2110/0008* (2021.01); *C08G 2110/0058* (2021.01); *C08G 2110/0083* (2021.01)

(58) Field of Classification Search
CPC .............. C08G 18/4833; C08G 18/632; C08G 18/7664; C08G 2110/0083; C08G 2110/0008; C08G 2110/0058
See application file for complete search history.

(56) References Cited

U.S. PATENT DOCUMENTS

| 3,558,529 | A |  | 1/1971 | Whitman et al. |
| 5,698,609 | A | * | 12/1997 | Lockwood ........... C08G 18/409 521/173 |
| 6,063,825 | A |  | 5/2000 | Isobe et al. |
| 2003/0236316 | A1 |  | 12/2003 | Heumen et al. |
| 2013/0150473 | A1 | * | 6/2013 | Miyazaki ........... C08G 18/4072 521/116 |
| 2013/0274364 | A1 |  | 10/2013 | Battistini |

FOREIGN PATENT DOCUMENTS

| JP | 2009138134 | A | * | 6/2009 | ............. C08G 18/42 |
| JP | 2010018817 | A | * | 1/2010 | ............. C08G 18/48 |
| JP | 2010254915 | A | * | 11/2010 | ............. C08G 18/00 |
| WO | 199816567 | A |  | 4/1998 | |
| WO | 200125305 | A |  | 4/2001 | |
| WO | 2003064491 | A |  | 8/2003 | |

OTHER PUBLICATIONS

JP-2010254915-A_Nov. 2010_English Translation.*
JP-2010018817-A_Jan. 2010_English Translation.*
JP-2009138134-A_Jun. 2009_English Translation.*

* cited by examiner

*Primary Examiner* — Michael L Leonard
(74) *Attorney, Agent, or Firm* — Huntsman International LLC; Robert Diaz

(57) ABSTRACT

A polyurethane foam material having the following properties:
- Compression hardness at 10% (according to ISO 3386/1) higher than 60 kPa and lower than 120 kPa;
- Free rise density in the range 40-80 kg/m$^3$ (according to ISO 845);
- Flexural modulus (according to ISO 1209-2) in range 0.95-2 MPa.

10 Claims, No Drawings

POLYURETHANE FOAMS HAVING IMPROVED MECHANICAL PERFORMANCE

CROSS-REFERENCE TO RELATED APPLICATIONS

This application is the National Phase of International Application PCT/EP2017/071116 filed Aug. 22, 2017 which designated the U.S. and which claims priority to European App. Serial No. 16190348.9 filed Sep. 23, 2016. The noted applications are incorporated herein by reference.

FIELD OF INVENTION

The present invention relates to a foamed polyurethane based material which combines the properties of typical flexible and rigid foamed polyurethane based material.

The foamed polyurethane based material of the invention has low density, sufficient hardness, good flexibility and good mechanical strength.

The present invention further relates to a method for making the foamed polyurethane based material of the invention.

The present invention further relates to a reactive composition comprising polyisocyanates and polyisocyanate reactive products for making the foamed polyurethane based material of the invention.

BACKGROUND OF THE INVENTION

Foamed flexible polyurethane based materials are known for their good flexibility but have on the other hand too low mechanical strength and too low hardness to be suitable for use in certain applications.

Foamed rigid polyurethane based materials are known for their mechanical strength and low density but have on the other hand too low flexibility to be suitable for use in certain applications of the invention.

On the other hand foamed elastomeric polyurethane based materials are known for their good flexibility but have too high densities to be suitable for use in certain applications of the invention.

In the past there were several attempts to improve the properties of foamed rigid polyurethane based materials to improve their flexibility. Vice versa there were several attempts to improve the properties of foamed flexible polyurethane based materials to increase their hardness and improve the mechanical strength.

U.S. Pat. No. 3,558,529 discloses to urethane polymers having improved stiffness-temperature properties. The aim of US'529 is to create a polyurethane foam which shows stiffness properties that are relatively independent of temperature. As isocyanate reactive, a mixture of a low molecular weight polyether polyol having a hydroxyl number of about 420 to about 650 and a high molecular weight polyether polyol having a hydroxyl number of from about 34 to about 56 is used. The obtained foam results however in a too soft foam (too low CLD value).

WO200125305 discloses a polyol combination for the preparation of low density viscoelastic foams, having very good properties in terms of hardness, hysteresis and energy absorption. The object of WO'305 is achieved by using a polyol combination comprising one or two specific polymer polyols in combination with a rigid polyol based on propylene oxide as the only alkylene oxide (ethylene oxide may in addition be used in amounts up to 40% maximum). The obtained foam results however in a too soft foam (too low CLD value).

WO03064491 relates to a rigid/semi-rigid isocyanate-based foam having a compression force deformation of greater than about 130 kPa at 10% deflection which is achieved by the introduction of a dendritic macromolecule into the formulation to produce rigid/semi-rigid isocyanate-based foam. The obtained foam results however in a too hard foam (too high CLD value) which on top lacks flexibility.

WO 98/16567 discloses polyol combinations for the preparation of energy absorbing foams. Using their combination of polyols, foams with a density of less than 50 kg/m$^3$ are achieved but the obtained foams results however in a too soft foam (too low CLD value).

For all reasons above indicated there is a need to develop a new polyurethane material or at least further improve state of the art polyurethane materials in order to achieve polyurethane foamed materials which have sufficient strength in combination with a light weight and which have very good mechanical properties (flexibility) such that the foam is able to retain its original shape if the polyurethane material is subject to deformation (bending, stretching, . . . ).

Aim of the Invention

It is a goal of the invention to improve the properties of a polyurethane foam such that it has low density in combination with increased flexibility and sufficient hardness thereby making said foam suitable for use in applications requiring combined strength and flexibility.

Surprisingly we have found a cellular (foamed) polyurethane material that has satisfactory strength and hardness and thereby maintains excellent flexibility.

It is a further object of the present invention to develop a reactive composition and a method for making the improved cellular (foamed) polyurethane material.

SUMMARY OF THE INVENTION

According to the invention, a reaction system is disclosed to make a polyurethane foam material having improved mechanical properties. Said foam having the following properties:

Compression hardness at 10% (according to ISO 3386/1) higher than 60 kPa and lower than 120 kPa;

Free Rise Density in the range 40-80 kg/m3 (according to ISO 845);

Flexural modulus (according to ISO 1209-2) in range 0.95-2 MPa.

According to embodiments, the polyurethane foam according to the invention has a compression set at 70° C. lower than 40% (according to ISO 1856) and a flexural stress (bending) at maximum load (according to ISO 1209-2) in the range 120-180 kPa.

According to embodiments, the polyurethane foam according to the invention has a free rise density in the range 45-65 kg/m3 measured according to ISO 845.

According to embodiments, the polyurethane foam according to the invention has a compression set at 70° C. lower than 40% (according to ISO 1856), preferably lower than 30%.

According to embodiments, the polyurethane foam according to the invention has a compression hardness at 10% (according to ISO 3386/1) in the range 70-110 kPa.

According to embodiments, the polyurethane foam according to the invention has a flexural stress (bending) at maximum load (according to ISO 1209-2) in the range 120-160 kPa.

According to embodiments, the polyurethane foam according to the invention has a flexural modulus (according to ISO 1209-2) in the range 0.95-1.75 MPa.

The reaction system for making the polyurethane foam material according to the invention is comprising at least:
- a polyisocyanate composition with isocyanate functionality between 2.2 and 2.7, and
- an isocyanate reactive composition comprising
  a) at least one polyoxyethylene based polyether, polyester or polyether polyester polyol having an average nominal hydroxyl functionality in the range 2.5-3.5, an hydroxyl value above 350 and an ethylene oxide content >85% by weight, and
  b) at least one polymer polyetherpolyol having a molecular weight in the range 2000-7000 and having solid particles in the range of 20-45 wt % calculated on the total weight of the polymer polyol
  wherein the amount of the polymer polyetherpolyol is 50-70 wt % calculated on the total weight of the isocyanate reactive composition (a)+b)); and
- optional chain extenders, and
- catalysts, and
- water and/or other blowing agents.

According to embodiments, the polyisocyanate composition in the reaction system according to the invention has an isocyanate functionality between 2.25 and 2.5.

According to embodiments, the at least one polymer polyetherpolyol in the reaction system according to the invention is a polyether polyol containing copolymerized styrene and acrylonitrile (SAN) solid particles.

According to embodiments, the polyurethane foam material according to the invention is made by reacting the reaction system according to the invention at an isocyanate index in the range 90-120, preferably in the range 100-110.

According to embodiments, the process for making the polyurethane foam material according to the invention using the reaction system of the invention comprises at least the steps of:
i. pre-mixing the isocyanate reactive composition with the chain extenders, catalysts, blowing agents, and other additives, and
ii. mixing the polyisocyanate composition with the pre-mixed isocyanate reactive composition obtained in step i to obtain a reacted polyisocyanate composition.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying examples which illustrate, by way of example, the principles of the invention.

Definitions and Terms

In the context of the present invention the following terms have the following meaning:
1) The isocyanate index or NCO index or index is the ratio of NCO-groups over isocyanate-reactive hydrogen atoms present in a formulation, given as a percentage:

$$\frac{[NCO] \times 100(\%)}{[\text{active hydrogen}]}$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is not only considered from the point of view of the actual polymerisation process preparing the material involving the isocyanate ingredients and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are also taken into account in the calculation of the isocyanate index.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

4) The word "average" refers to number average unless indicated otherwise.

5) "Liquid" means having a viscosity of less than 10 Pa·s measured according to ASTM D445-11a at 20° C.

6) "pbw" means part by weight.

7) The term "reaction system" refers to a combination of ingredients wherein the polyisocyanate composition is kept in a container separate from the isocyanate-reactive ingredients.

8) The term "flexural modulus" (modulus of elasticity) refers to the force required to bend a material under three point loading conditions or the tendency for a material to bend. It is determined from the slope of a stress-strain curve produced by a flexural test, and is expressed in units of force per area. Flexural modulus is used as an indication of a material's stiffness when flexed and is measured according to ISO 1209-2.

9) The term "flexural stress" at maximum load is a material property, defined as the stress in a material just before it yields in a flexure test and is measured according to ISO 1209-2. The flexural stress is the maximum stress in a material during the flexural bending test and is expressed in kPa.

10) The term "Compression set" refers to the compression set measured at 70° C. for 50% compression of the material for 22 hours and is measured according to ISO 1856.
11) The term "Free Rise Density" refers to the density measured on foam samples made under atmospheric conditions (in the presence of blowing agents) according to ISO 845.
12) The term "Compression hardness", also referred to as Compression Load Deflection (CLD) refers to the compression load deflection at 10% compression measured according to ISO 3386/1.

DETAILED DESCRIPTION

This invention relates to polyurethane foams combining the hardness of a rigid foam and the flexibility of a flexible polyurethane foam, to formulations suitable for making said foams and methods for making said foams. Said foams are in particular suitable for use in applications requiring combined strength and flexibility of the foam such as the use in shoe uppers, use in bags and backpacks to improve reinforcement of at least part of the material, . . . .

Surprisingly we have found a cellular (foamed) polyurethane material that has satisfactory performance and thereby maintains excellent flexibility and hardness performance. The polyurethane elastomeric composition according to the invention makes it possible to compete with the properties of known materials in the art such as Ethylene Vinyl Acetate (EVA) and Ethylene Vinyl Acetate/polyethylene mixed materials (EVA/PE).

According to the invention, a polyurethane foam material is disclosed, said polyurethane foam material having the following properties:
Compression hardness at 10% (according to ISO 3386/1) higher than 60 and lower than 120 kPa;
Free Rise Density in the range 40-80 kg/m$^3$ (according to ISO 845);
Flexural modulus (according to ISO 1209-2) in range 0.95-2 MPa.

According to embodiments, the polyurethane foam material according to the invention is having a free rise density in the range 45-65 kg/m$^3$ measured according to ISO 845.

According to embodiments, the polyurethane foam material according to the invention is having compression set at 70° C. lower than 40% (according to ISO 1856).

According to embodiments, the polyurethane foam material according to the invention is having a flexural stress (bending) at maximum load (according to ISO 1209-2) in the range 120-180 kPa.

According to embodiments, the polyurethane foam material according to the invention is having a Flexural stress (bending) at maximum load (according to ISO 1209-2) in the range 120-180 kPa and a compression set at 70° C. lower than 40% (according to ISO 1856).

According to embodiments, the polyurethane foam material according to the invention is having a compression set at 70° C. lower than 30% (according to ISO 1856).

According to embodiments, the polyurethane foam material according to the invention is having a compression hardness at 10% (according to ISO 3386/1) is preferably in the range 70-110 kPa.

According to embodiments, the polyurethane foam material according to the invention is having a flexural stress (bending) at maximum load (according to ISO 1209-2) in the range 120-160 kPa.

According to embodiments, the polyurethane foam material according to the invention is having a flexural modulus (according to ISO 1209-2) in the range 0.95-1.75 MPa.

According to embodiments, the polyurethane foam material according to the invention may optionally be coated or covered with an additional layer, such as a protective wear layer.

The reaction system for making the polyurethane foam material according to the invention is comprising at least:
a polyisocyanate composition with isocyanate functionality between 2.2 and 2.7, and
an isocyanate reactive composition comprising
    a) at least one polyoxyethylene based polyether, polyester or polyether polyester polyol having an average nominal hydroxyl functionality in the range 2.5-3.5, an hydroxyl value above 350 and an ethylene oxide content >85% by weight, and
    b) at least one polymer polyetherpolyol having a molecular weight in the range 2000-7000 and having solid particles in the range of 20-45 wt % calculated on the total weight of the polymer polyol
    wherein the amount of the polymer polyetherpolyol is 50-70 wt % calculated on the total weight of the isocyanate reactive composition; and
optional chain extenders, and
catalysts, and
water and/or other blowing agents.

According to embodiments, the at least one polyoxyethylene based polyether, polyester or polyether polyester polyol is a glycerol initiated polyether polyols such as commercially available Daltolac® R411, Daltolac® R391, Daltolac® R540 and Daltolac® R570 (from Huntsman).

According to embodiments, the at least one polymer polyol is selected from a filled polyether polyol having solid particles in the range of 20-45 wt % calculated on the total weight of the polyol and wherein said polymer polyol is a dispersion of polymer solid particles such as styrene based polymer particles in the polyol. Examples of styrene polymer particles include so-called "SAN" particles of styrene-acrylonitrile.

According to embodiments, the at least one polymer polyetherpolyol is a polyether polyol containing copolymerized styrene and acrylonitrile (SAN) solid particles such as commercially available SPECFLEX® NC 700 having 39-42 wt % SAN solid particles calculated on the total weight of the polymer polyol (from DOW chemicals).

According to embodiments, the polyisocyanate composition comprises mixtures of polyisocyanates. For example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred polyisocyanate compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates.

According to embodiments, the polyisocyanate composition may be an isocyanate-terminated prepolymer having a free NCO-value of 15-30% by weight comprising an isocyanate-terminated prepolymer which is the reaction product of an excess of an organic polyisocyanate and at least one polyether or polyester polyol having an average nominal hydroxyl functionality of 2-4, a number average molecular weight of 2000-8000.

The isocyanate-terminated prepolymer is prepared by reaction of an excessive amount of the polyisocyanate with the polyether polyol in order to obtain a prepolymer having the indicated NCO value. Methods to prepare prepolymers have been described in the art. The relative amounts of polyisocyanate and polyether polyol depend on their equivalent weights and on the desired NCO value and can be determined easily by those skilled in the art. If desired, the reaction may be conducted in the presence of catalysts which enhance the formation of urethane groups, like tertiary amines and tin compounds. In general the reaction time is between 30 minutes and 4 hours and the temperature between 50 and 90° C.

According to embodiments, blowing agents may be selected from fluor based hydrocarbon compounds (hydrofluorocarbon compounds) and/or alternatively from acetal based compounds and/or water. The blowing agents used may be a combination of aforementioned compounds.

According to embodiments, the blowing agent may be a fluor based hydrocarbon compound. A suitable fluor based hydrocarbon compound is Forane® 365 (available from Arkema). The amount of fluor based hydrocarbon compound (if used alone) is in the range 3-6 wt % calculated on the total weight of the reaction system.

The amount of water used as foaming agent, preferably in the absence of other blowing agents, may be varied in known manner in order to achieve the desired density. Suitable amounts of water are generally at least 0.3 parts by weight, preferably from 0.3-3 parts by weight, per 100 parts of the reaction system. Preferably water is the sole blowing agent.

The reaction system further may comprise conventional additives like catalysts, surfactants, colorants, stabilisers, fillers and mold release agents.

If chain extenders and/or cross-linkers are used, these are preferably selected from polyols having an hydroxyl functionality of 2-6 and preferably 2-4 and a molecular weight of 62-499, like ethylene glycol, (mono) ethylene glycol, diethylene glycol, propylene glycol, dipropylene glycol, butane diol, glycerol, trimethylolpropane, hexanediol, pentaerythritol and polyethylene glycols of MW of 499 and less. The amount of chain extenders and cross-linker is at most 15 parts by weight per 100 parts by weight of polyol used to react with the polyisocyanate composition. Preferred examples of suitable chain extenders are mono-ethyleneglycol (MEG), butanediol and/or hexanediol.

Furthermore, a process for making the polyurethane foam material according to the invention is disclosed. Said process comprises reacting at an isocyanate index in the range 90-120, preferably in the range 100-110 the reactive system according to the invention.

Conventionally the isocyanate reactive composition is premixed with the chain extenders, catalysts, blowing agents, and other additives and then reacted with the polyisocyanate composition.

The method for making the polyurethane foam according to the invention comprises reacting the ingredients of the reaction system, optionally in a mould.

The method for making the polyurethane foam according to the invention may be a continuous or discontinuous process, a restricted or non-restricted rise process (comprising slab stock and batch block processes).

According to embodiments, the process for making the polyurethane foam material according to the invention comprises at least the steps of:
i. pre-mixing the isocyanate reactive composition with the chain extenders, catalysts, blowing agents, and other additives, and
ii. mixing the polyisocyanate composition with the pre-mixed the isocyanate reactive composition obtained in step i to obtain a reacted polyisocyanate composition.

According to embodiments, the step of mixing the polyisocyanate composition with the pre-mixed isocyanate reactive composition obtained in step i is performed using a multi component mixing system.

According to embodiments, the step of mixing the polyisocyanate composition with the pre-mixed isocyanate reactive composition obtained in step i is performed using a multi component dynamic mixing system.

Furthermore the invention use of the polyurethane foam according to the invention in applications requiring combined strength and flexibility of the foam such as the use in shoe uppers, use in bags and backpacks to improve reinforcement of at least part of the material.

The invention is illustrated with the following examples.

EXAMPLES

Chemicals Used:
Daltolac® R411, a glycerol initiated polyether polyols having OH value of 420 and functionality of 3 available from Huntsman
Daltocel® F526, a glycerol initiated ethylene oxide polyether polyol, functionality of 3, OH value of 128 mg KOH/g available from Huntsman
Daltolac® F428, a glycerol initiated polyether polyol with OH value of 28 mg KOH/g, containing 15 wt % EO units, available from Huntsman
Daltolac® R210, a sorbitol/water initiated propylene oxide polyether polyol with OH value of 415 mg KOH/g and functionality of 3, available from Huntsman
Polyisocyanate composition Suprasec® 2940 having an NCO value of 27.9% and a functionality of 2.39 is a polyisocyanate variant comprising di-isocyanate, polymeric polyisocyanate and a polyisocyanate prepolymer available from Huntsman
Water
Chain extender polyethylene glycol, PEG 300, OH value of 415 mg KOH/g, functionality of 2 and MW=300
Catalyst A=Dabco® EG from Air Products
Catalyst B=Niax® A1, an amine type polyurethane catalyst available from Momentive
Surfactant Niax® L-500 available from Momentive
Anti oxidants Vanox® 945 available from Vanderbilt Chemicals and Irganox® 1135 available from BASF Preparation of Cellular Polyurethane Composition According to the Invention and Comparative Examples The reactive polyisocyanate composition was prepared by mixing the isocyanate reactive composition comprising the catalysts and additives with the isocyanate prepolymer composition at an index of 104.

Example 1 is according to the invention, the comparative examples are using reactive composition falling outside the claimed ratio and/or reaction systems according to the state of the art. Table 1 below shows the composition of the reactive system used in wt %.

TABLE 1

| Reaction System | Example 1 | Comp. 1 | Comp. 2 | Comp. 3 | Comp. 4 | Comp. 5 |
|---|---|---|---|---|---|---|
| NC 700 | 30 | 30 | 30 | 15 | — | 40 |
| R210 | | | 20 | | | |
| F428 | | | | 15 | 30 | |
| R 040 | | | | | | |
| PEG 300 | | | | | | |
| F 526 | | | | | | |
| Jeffox ® WL-440 | | 22.4 | | | | |
| R 411 | 20 | | | 20 | 20 | 15 |
| Water | 1.2 | 1.2 | 1.2 | 1.2 | 1.2 | 1.2 |
| Dabco EG | 0.12 | 0.12 | 0.12 | 0.12 | 0.12 | 0.12 |
| Niax ® A1 | 0.16 | 0.16 | 0.16 | 0.16 | 0.16 | 0.16 |
| Niax ® L-500 | 1 | 1 | 1 | 1 | 1 | 1 |
| Antioxidant | 0.52 | 0.52 | 0.52 | 0.52 | 0.52 | 0.52 |
| Isocyanate composition | | | | | | |
| Suprasec ® 2940 | 47 | 44.6 | 46.7 | 47 | 47 | 42 |
| NCO | 27.9 | 27.9 | 27.9 | 27.9 | 27.9 | 27.9 |
| Index | 104 | 104 | 104 | 104 | 104 | 104 |

Table 2 below shows the characteristics of the foam obtained by reacting the reactive composition according to Table 1 at an isocyanate index of 104.

TABLE 2

| | unity | Example 1 | Comp. 1 | Comp. 2 | Comp. 3 | Comp. 4 | Comp. 5 |
|---|---|---|---|---|---|---|---|
| Density core | kg/m$^3$ | 59 | 61 | 47 | 55 | 55 | 62 |
| Compression set (70° C./50%/22 h) | % | 34 | 36 | 47 | 10 | 6 | 27 |
| Rigid bending ISO1209 | kPa | 135 | 107 | 203 | 59 | 29 | 109 |
| Flex stress @ max load | mm | 25.6 | 24.2 | 23.0 | 26.9 | 28.3 | 26.2 |
| Displacement @ max load | kPa | 131 | 104 | 202 | 55 | 26 | 105 |
| load @ 20 mm displacement | MPa | 1.14 | 0.84 | 2.86 | 0.44 | 0.20 | 0.89 |
| Flex modulus | N | 7.60 | 6.30 | 11.20 | 3.40 | 1.50 | 6.30 |
| Load @ max displacement | | | | | | | |
| Comp Hardness | | | | | | | |
| 1 cycle - ISO 3386/1 | kPa | 90 | 58 | 155 | 31 | 18 | 81 |
| Comp Hardn @ 10% | kPa | 93 | 68 | 144 | 39 | 23 | 88 |
| Comp Hardn @ 25% | kPa | 103 | 78 | 153 | 44 | 26 | 98 |
| Comp Hardn @ 40% | kPa | 116 | 90 | 163 | 50 | 30 | 112 |
| Comp Hardn @ 50% | % | 79 | 74 | 91 | 65 | 57 | 76 |
| Hysteresis loss | | | | | | | |

The invention claimed is:

1. A reaction system for making a polyurethane foam material having a compression hardness at 10% according to ISO 3386/1 higher than 60 kPa and lower than 120 kPa; a free rise density in the range 40-80 kg/m$^3$ according to ISO 845, a flexural modulus according to ISO 1209-2 in range 0.95-2 MPa, said reaction system comprising at least:
  a polyisocyanate composition with isocyanate functionality between 2.2 and 2.7, and
  an isocyanate reactive composition comprising
   a) at least one polyoxyethylene based polyether, polyester or polyether polyester polyol having an average nominal hydroxyl functionality in the range 2.5-3.5, an hydroxyl value above 350 and an ethylene oxide content >85% by weight, and
   b) at least one polymer polyetherpolyol having a molecular weight in the range 2000-7000 and having solid particles in the range of 20-45 wt % calculated on the total weight of the polymer polyol
  wherein the amount of the polymer polyetherpolyol is 50-70 wt % calculated on the total weight of the isocyanate reactive composition (a)+b)); and
  optional chain extenders, and
  catalysts, and
  water and/or other blowing agents.

2. The reaction system according to claim 1, wherein the foam has a flexural stress (bending) at maximum load according to ISO 1209-2 in the range 120-180 kPa.

3. The reaction system according to claim 1, wherein the foam has a free rise density in the range 45-65 kg/m$^3$ measured according to ISO 845.

4. The reaction system according to claim 1, wherein the foam has a compression set at 70° C. according to ISO 1856 lower than 40%.

5. The reaction system according to claim 1, wherein the foam has a compression hardness at 10% according to ISO 3386/1 in the range 70-110 kPa.

6. The reaction system according to claim 1, wherein the foam has a flexural modulus according to ISO 1209-2 in the range 0.95-1.75 M Pa.

7. The reaction system according to claim 1, wherein the polyisocyanate composition has an isocyanate functionality between 2.25 and 2.5.

8. The reaction system according to claim 1, wherein the at least one polymer polyetherpolyol is a polyether polyol containing copolymerized styrene and acrylonitrile (SAN) solid particles.

9. A process for making a polyurethane foam material comprising reacting at an isocyanate index in the range of 90-120, the reaction system according claim 1.

10. The process according to claim 9 comprising at least the steps of:
   i. pre-mixing the isocyanate reactive composition with the chain extenders, catalysts, blowing agents, and other additives, and
   ii. mixing the polyisocyanate composition with the pre-mixed the isocyanate reactive composition obtained in step (i) to obtain a reacted polyisocyanate composition.

\* \* \* \* \*